(12) United States Patent
Paul

(10) Patent No.: US 6,803,081 B2
(45) Date of Patent: Oct. 12, 2004

(54) RADIATION CURABLE ADHESIVE

(75) Inventor: Charles W. Paul, Madison, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/891,985

(22) Filed: Jun. 26, 2001

(65) Prior Publication Data

US 2003/0065048 A1 Apr. 3, 2003

(51) Int. Cl.$^7$ .............................. B32B 7/12; B32B 1/08; C09J 153/00; C09J 163/00
(52) U.S. Cl. ..................... 428/34.1; 428/345; 522/109; 522/110; 522/31; 522/146
(58) Field of Search .............................. 428/43.1, 345; 522/31, 109, 110, 146, 111, 112; 525/314, 89, 90–99; 524/47, 483, 484

(56) References Cited

U.S. PATENT DOCUMENTS

| | | | | |
|---|---|---|---|---|
| 4,135,037 A | * | 1/1979 | Udipi et al. | 156/330 |
| 4,656,213 A | * | 4/1987 | Schlademan | 524/272 |
| 5,183,664 A | * | 2/1993 | Ansell | 424/445 |
| 5,382,604 A | * | 1/1995 | Erickson | 522/158 |
| 5,446,104 A | * | 8/1995 | Handlin, Jr. et al. | 524/81 |
| 5,536,772 A | * | 7/1996 | Dillman et al. | 522/111 |
| 5,641,823 A | | 6/1997 | Masse et al. | |
| 5,686,535 A | * | 11/1997 | Erickson et al. | 525/314 |
| 5,691,414 A | * | 11/1997 | Kübler et al. | 525/93 |
| 5,776,998 A | * | 7/1998 | Southwick et al. | 522/109 |
| 5,840,809 A | * | 11/1998 | Ohtsuka et al. | 525/314 |
| 6,649,259 B1 | * | 11/2003 | Hu et al. | 428/343 |

FOREIGN PATENT DOCUMENTS

| | | |
|---|---|---|
| JP | 2000256637 | 9/2000 |
| WO | WO 01/29134 A1 * | 4/2001 |

OTHER PUBLICATIONS

WO 97/06836, "Adhesives", Smith & Nephew PLC, Feb. 1997.*
Irving Skeist, Ph.D., Ed., Handbook of Adhesives, Third Edition, "Resins For Elastomer–Based Adhesives": 1990, p. 563.
Hercules™ Rosins, Resoures for the New Mellenium, Table III, pp. 4–5, no date.

* cited by examiner

Primary Examiner—Susan Berman
(74) Attorney, Agent, or Firm—Cynthia L. Foulke

(57) ABSTRACT

Radiation curable adhesive comprising an epoxidized block copolymer, a saturated block copolymer and/or a rosin derived alcohol, and a photoinitiator. The adhesives find particular use in the tape and label industry.

15 Claims, No Drawings

RADIATION CURABLE ADHESIVE

FIELD OF THE INVENTION

The invention relates to the field of adhesives. More specifically, the invention relates to radiation curable adhesives based on epoxy-functional block copolymers.

BACKGROUND OF THE INVENTION

Radiation curable adhesives which cure by free radical mechanisms have gained wide acceptance in a number of product assembly applications. Cationic curing systems enjoy several advantages over free radical systems. First, cure is not instantaneous and thus the possibility exists to irradiate the sample and then make the bond. This feature obviates the need for one substrate being radiation transparent, which many are not. Secondly, since there is no termination mechanism other than neutralization of the active acid catalyst by impurities, the cure proceeds into the "dark" (i.e. non-irradiated) regions of the sample. Thus, if impurities are minimized the entire adhesive sample will eventually cure as long as one part of it is irradiated.

Most cationic systems use cycloaliphatic epoxide monomers or vinyl ethers. Kraton Polymers recently developed a system based on epoxidized block copolymers, with the epoxy groups residing almost exclusively in the polyisoprene blocks. These systems enabled highly flexible and even pressure sensitive radiation cured adhesives based on cationic cure chemistry. However, the systems have been hindered by high costs, primarily because of the use of expensive mono-ol liquids that have been used in place of mineral oils to maximize pressure sensitive adhesive properties, and also by the tendency for preferred photoinitiators (which are present as finely dispersed particles) to settle over time in the liquid or "warm melt" adhesives.

A need remains for radiation curable adhesives that may be formulated at a lower cost and that avoid certain problems previously encountered in the art. The current invention addresses this need.

SUMMARY OF THE INVENTION

It has now been discovered that an improved balance of properties can be obtained by combining epoxidized block copolymers with other saturated block copolymers containing a hard block and/or by adding lower levels of rosin derived alcohols. Hot melt adhesives with superior pressure sensitive adhesive properties have been obtained by this method. In these solid adhesives settling of the dispersed photoinitiator particles is effectively eliminated, thus ensuring a long shelf life.

The invention provides adhesive formulations based on epoxidized block copolymers and contain a rosin-derived alcohol or a saturated block copolymer which are particularly advantageous for use as a labeling adhesive, i.e., for applying a label to a container such as, for example, a bottle, and for use in the manufacture of industrial tapes.

One aspect of the invention is directed to a radiation curable adhesive comprising an epoxidized block copolymer, a saturated block copolymer and/or a rosin derived alcohol, and a photoinitiator. Preferred saturated block copolymers are styrenic block copolymers. The adhesives of the invention may optionally comprise a hydrocarbon resin, a rosin and/or rosin ester, and an oil.

Preferred adhesives will typically comprise from about 10 to about 60% by weight of at least one epoxidized block copolymer, from about 3% to about 30% by weight of at least one saturated block copolymer and/or from about 3% to about 20% of a rosin derived mono-ol, from about 20% to about 70% of at least one hydrocarbon resin, up to about 25% of a rosin and/or rosin ester, up to about 0 to about 30% of a mineral oil, and an effective amount of a photoinitiator.

Another aspect of the invention is directed to an article of manufacture comprising the adhesive of the invention. In one embodiment the article is a labeled container. In another embodiment the article is an adhesive tape.

DETAILED DESCRIPTION OF THE INVENTION

The disclosures of all references cited herein are incorporated in their entireties by reference.

The invention is directed to adhesives based on epoxidized block copolymers and containing a rosin-derived alcohol or a saturated block copolymer. In the adhesives of the invention, settling of the dispersed photoinitiator is surprisingly minimized. The adhesives of the invention are generally less expensive than prior art formulas, due in part to the raw materials, and exhibit improved properties in terms of tack, peel and shear.

The curable adhesives are radiation curable adhesives. The adhesives may, desirably, be formulated as a "hot melt," a "warm melt" or a liquid adhesive, and formulated to be pressure sensitive or not. "Hot melt" adhesives are defined here as those applied at temperatures from 250° F. to 400° F., whereas "warm melt" adhesives are applied at temperature above ambient but below 250° F. "Liquid" adhesive require no heat for their application; they are applied at ambient conditions.

As used herein, the term "pressure-sensitive adhesive" refers to a viscoelastic material which adheres instantaneously to most substrates with the application of slight pressure and remains permanently tacky. Pressure sensitive adhesives are bondable at ambient conditions indefinitely. Non-pressure sensitive adhesives are used to form bonds while in the molten state, i.e. they are applied hot to the substrate and bonded to the second substrate prior to setting. Once set they have little if any tack or bondability. One cannot coat these types of adhesives onto one substrate and create a bond with them to a second substrate at a later date at ambient conditions as can be done with a true pressure sensitive.

The term "curable" is used herein in its conventional sense as meaning capable of forming covalent cross-links.

The term "radiation-curable adhesive" as used herein means an adhesive composition that is curable upon exposure to actinic and/or ionizing radiation. The term "radiation" is used herein to include actinic radiation such as ultraviolet radiation and ionizing radiation created by the emission of electrons or highly accelerated nuclear particles such as neutrons, alpha-particles etc.

Preferred radiation curable adhesives comprise, as the base polymer, at least one epoxidized block copolymer capable of UV cationic curing. Epoxidized block copolymers which may be used in the practice of the invention include those described in U.S. Pat. Nos. 5,229,464, 5,491,193, 5,516,824, 5,686,535, 5,776,998, and 5,837,749, and are commercially available from Kraton Polymers. Both radial and linear epoxidized block copolymers may be used in the practice of the invention for use. A preferred epoxidized block copolymer which may be used in the practice of the invention is EKP 207 (Kraton Polymers), a diblock copolymer prepared by the sequential polymerization of isoprene and butadiene, followed by hydrogenation and epoxidation. EKP 207 contains about 11 epoxide groups per molecule.

The adhesive of the invention will typically comprise about 10% to about 60% of the epoxidized block copolymer.

Saturated block copolymers consist of materials of the structure $(A-B)_n-A$, or $(A-B)_nX$, or $(A-B)_n$, or $(A-B)_nX-C_m$ wherein X is a multivalent coupling agent with functionality m+n of two or more, and polymer blocks A are non-elastomeric polymer blocks and polymer blocks B are saturated elastomeric blocks, and polymer blocks C are either saturated or unsaturated, preferably unsaturated elastomeric blocks. Saturated blocks are substantially hydrogenated such that the majority of olefinic groups have been eliminated. Copolymers useful in the present invention may be linear or radial; with radial copolymers the functionality of X is three or more. Some levels of diblock copolymer, A-B, may be present by design or due to incomplete coupling of the A-B arms to X. Diblock is beneficial for increasing tack, peel and open time, but reduces cohesive strength and resistance to cold flow prior to cure.

Examples of multifunctional coupling agents, "X", include dibromoethane with functionality of 2; trisnonylphenyl phosphite and trichloromethyl silane, both with functionality of 3; and tetra chlorosilane with functionality of 4.

The non-elastomeric blocks A may comprise homopolymers or copolymers of vinyl monomers such as vinyl arenes, vinyl halides, and vinyl carboxylates, as well as acrylic monomers such as acrylonitrile, methacrylonitrile, esters of acrylic acids, etc. Monovinyl aromatic hydrocarbons include styrene, vinyl toluene, vinyl xylene, ethyl vinyl benzene as well as dicyclic monovinyl compounds such as vinyl naphthalene and the like. Other non-elastomeric polymer blocks may be derived from alpha olefins such as vinyl cyclohexane, or other rigid olefins such as norbornene, pinene, and the like. Styrene is preferred, in an amount comprising less than 45% by weight of the total copolymer composition, more preferably 15 to 25%, however it is most preferred that the least amount of styrene possible is used in order to maximize the softness and flexibility of the final cured adhesive, while still forming hard styrene domains upon cooling to produce a solid adhesive. The elastomeric blocks B and C are derived from a diene or dienes (preferably isoprene and/or butadiene). The B blocks are substantially hydrogenated (saturated) by means well known in the art. It is preferred that the C blocks, if present, are not hydrogenated, and most preferably are isoprene. Suitable saturated block copolymers include SEBS (polystryene end blocks with a hydrogenated butadiene midblock) and SEPS (polystyrene end blocks with a hydrogenated isoprene midblock). Polymers high in diblock (SEB or SEP) are preferred. High levels are those above 10%, with levels above 25% preferred, and levels of above 40% most preferred. Block copolymer molecules with more than one hard (high Tg) A block provide the adhesive with strength and resistance to cold-flow (the resistance to slumping in the unsupported state at ambient conditions) prior to cure. Diblock copolymer molecules improve the pressure sensitivity of the final cured adhesive. Even more preferred are radial block copolymers in which both functions—strength and pressure sensitivity—are derived from one molecule. These radial materials contain hard A blocks at the ends of at least two of the arms and one or more arms consisting of C blocks. The latter arms are termed free arms or pendant arms since they are not linked into the hard domains when the adhesive cools (no A block). These pendant arms are derived form diene monomers and may be saturated (via subsequent hydrogenation) or unsaturated. Preferably these pendant arms are derived from isoprene. An example of such a material is GRP 6919, also referred to as "Tacky G", a $(SEB)_2-X-(I)_2$ radial block copolymer available from Kraton Polymers.

Adhesives of the invention will typically comprise about 3% to about 30%, more preferably from about 5% to about 15%, of the styrenic block copolymer.

Suitable rosin derived alcohols include hydrogenated rosin, available from Hercules under the tradename Abitol E, and chemical derivatives of rosin available from Arakawa Chemical under the tradename Pinecrystal.

Adhesives of the invention will typically comprise about 3% to about 20%, more preferably up to about 15%, of the rosin derived alcohol. The level will depend on the level of pressure sensitivity needed in the final adhesive and the amount and type of epoxidized block copolymer used. The alcohol acts as a chain transfer agent during cationic polymerization of the epoxy groups. Diols can act as crosslinkers whereas mono-ols will act to reduce the crosslink density and improve the adhesion of the crosslinked polymer through pendant rosin substituents. Diols used in excess (over the amount of epoxy) can also improve tack and reduce overall crosslink density. Mono-ols are most preferred. It has been discovered that use of a rosin alcohol produces a cured adhesive with more extensibility as measured by free swell in cyclohexane, which dissolves the saturated polymer and everything else that is not crosslinked. Peel and tack are also improved.

The adhesive compositions of this invention also may include an aliphatic or cycloaliphatic hydrocarbon resin with or without aromatic modification (preferably without), such as those derived from terpene monomers or from petroleum-derived monomers, as tackifier. Preferred are hydrogenated petroleum-derived hydrocarbon resins. Non-limiting examples include aliphatic olefin derived resins such as those available from Goodyear under the Wingtack® tradename and the Escorez® 1300 series from ExxonMobil. A common $C_5$ tackifying resin in this class is a diene-olefin copolymer of piperylene and 2-methyl-2-butene having a softening point of about 95° C. This resin is available commercially under the tradename Wingtack 95 and is prepared by the cationic polymerization of a mixture containing approximately 60% piperylene, 10% isoprene, 5% cyclo-pentadiene, 15% 2-methyl-2-butene and about 10% dimer, as taught in U.S. Pat. No. 3,577,398. The resins normally have ring and ball softening points as determined by ASTM method E28 between about 20° C. and 150° C. Also useful are $C_5/C_9$ aromatic/aliphatic olefin-derived resins available from ExxonMobil in the Escorez 2000 series. Hydrogenated hydrocarbon resins are especially useful when the long term resistance to oxidation and ultraviolet light exposure is required. These hydrogenated resins include such resins as the Escorez 5000 series of hydrogenated cycloaliphatic resins from ExxonMobil, hydrogenated $C_9$ and/or $C_5$ resins such as Arkon® P70, P90, P115, P125 supplied by Arakawa Chemical, hydrogenated aromatic hydrocarbon resins such as Regalrez® 1018, 1085 and the Regalite® R series of resins from Hercules Specialty Chemicals. Other useful resins include hydrogenated polyterpenes such as Clearon® P-105, P-115 and P-125 from the Yasuhara Yushi Kogyo Company of Japan. Preferred for use are hydrogenated, cyclic or $C_5$ resins, such as Escorez 5400 (ExxonMobil), a hydrogenated DCPD (dicylopentadiene) tackifer. Mixtures of two or more of the above described resins may be preferred for some formulations.

Adhesives of the invention will typically contain from about 20% to about 70% of the hydrogenated resin, more preferably from about 30% to about 60%.

The adhesives of the invention may optionally contain a rosin and/or rosin ester. These tackifiers are added to improve the adhesion to various surfaces, especially polar surfaces such as glass, metal, or corona-treated plastics. Representative examples are natural and modified rosins including gum rosin, wood rosin, tall oil rosin, distilled rosin, hydrogenated rosin, dimerized rosin, and polymerized rosin; glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin.

The rosin and/or rosin ester will typically be used in amounts of up to about 25%. Rosin is preferred over rosin ester for maximum adhesion to polar substrates.

The adhesives of the invention may also comprise up to about 30% by weight of an oil diluent. Suitable oils include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Preferred are petroleum derived white oils such as Britol 35T, a paraffinic white oil and KAYDOL OIL a napthenic white oil, both of which are available from Witco Corporation.

The cationic photoinitiators are typically employed in concentrations ranging from about 0.01% by weight to about 10% by weight, preferably in amounts ranging from about 0.05% by weight to about 1% by weight, more preferably from about 0.1% by weight to about 0.5% by weight. Combinations of two or more photoinitiators may also be used. A preferred photoinitiator, is Sarcat CD1010 (available from Sartomer), a triaryl sulfonium hexafluoroantimonate salt also available from Union Carbide under the tradename Cyracure UVI 6974. For liquid adhesives, the less thermally stable iodonium salt, Sarcat CD1012, is suitable.

Photosensitizers may be added to extend the spectral response to higher wavelengths and thus speed cure and improve depth of cure. For example phenothiazine, perylene, and anthracene are effective sensitizers for both sulfonium and iodonium salts.

Combinations of photoinitiators may be used to achieve the best possible cure of adhesive compositions. Photoinitiators are preferably used in the least amount necessary to get initiation of cure at the line speed of the process. Cationic cure is inhibited by basic species such as amines or even water, and these must therefore be avoided or adequate photoinitiator added to overcome them.

Antioxidants are typically added to the commercially available compounds in order to protect the ingredients against degradation during preparation and use of the adhesive compositions. Combinations of antioxidants are often more effective due to the different mechanisms of degradation to which various polymers are subject. Certain hindered phenols, organo-metallic compounds, aromatic amines, aromatic phosphites, and sulphur compounds are useful for this purpose. Examples of effective types of these materials include phenolic antioxidants, thio compounds, and tris-(nonylated phenyl)phosphites.

Examples of commercially available antioxidants include IRGANOX 1010 (pentaetythrityl-tetrakis[3-(3,5-di-tert-butyl-4-hydroxyphenyl)propionate); IONOL (2,6-di-tertiary-butyl-4-methyl phenol); IONOX 330 (3,4,6-tris(3, 5-di-tertiary-butyl-p-hydroxybenzyl)-1,3,5-trimethylbenzene); and POLYGARD HR (tris-(2,4-di-tertiary-butyl-phenyl) phosphite). The antioxidant chosen must not interfere with the radiation cure of the final composition. Irganox 1010 has been found to be suitable in combination with the photoinitiator UVI 6974.

To ensure long-term thermal stability, in general from about 0.1% to about 3% by weight of one or more antioxidants is included in the adhesive compositions, preferably from about 0.4% by weight to about 1.5% by weight.

Additional materials may be added optionally to the adhesive composition at up to about 15% by weight, preferably from about 5% by weight to about 10% by weight, dependent on the intended end-use of the adhesive. Such additional materials include, without limitation, unsaturated block copolymers of monovinyl aromatic hydrocarbons and conjugated dienes such as polystyrene-polybutadiene-polystyrene, polystyrene-polyisoprene-polystyrene, poly(alpha-methyl-styrene)-polybutadiene-poly(alpha-methyl-styrene), poly(alpha-methyl-styrene)-polyisoprene-poly(alpha-methyl-styrene). Other polymers that can be added to modify adhesive properties include hydrogenated radial polyisoprene (for example Kraton G1750 sold by Kraton Polymers). Polyisobutylene, butyl rubber, polyisoprene, polybutadiene, and ethylene propylene random copolymers, and styrene butadiene random copolymers.

In addition to the above-described additional materials, the various compositions of the present invention may include other additives known to those skilled in the art. These additives may include, but are not limited to, pigments, fillers, waxes, fluorescent additives, flow and leveling additives, wetting agents, surfactants, antifoaming agents, rheology modifiers, and stabilizers. Preferred additives are those which do not have appreciable absorption in the wavelengths of interest and are not basic.

Examples of waxes include petroleum-derived such as paraffin wax, or synthetic waxes such as those produced by Fischer-Tropsch chemistry. Naturally derived waxes including non-reactive waxes and reactive waxes such as castor wax (which can react through its hydroxyl groups during cure).

Examples of pigments and filler materials include, but are not limited to, titanium dioxide, hydrophobic amorphous fumed silica, amorphous precipitated silica, carbon black, and polymer powders. Examples of flow and leveling additives, wetting agents, and antifoaming agents include silicones, hydrocarbons, fluorine-containing compounds, and non-silicone polymers and copolymers such as copolyacrylates.

Other materials which may be added optionally to the adhesive composition include endblock resins which are substantially aromatic. Examples of such endblock resins can be prepared from any substantially aromatic monomers having a polymerizable unsaturated group. Typical examples of such aromatic monomers include the styrenic monomers, styrene, alpha-methyl styrene, vinyl toluene, methoxy styrene, tertiary butyl styrene, chloro styrene, etc., indene monomers including indene, and methyl indene. The aromatic endblock resin is preferably present in amounts of 5 to 20 weight percent. Preferred is HERCOLITE 240 or KRISTALEX 5140, both of which are alpha methyl styrene resins available from Hercules, Inc.

One embodiment of the invention is directed to an adhesive comprising an epoxidized block copolymer, a saturated block copolymer, and a photoinitiator. The adhesives of the invention may optionally further comprise a hydrocarbon resin, a rosin derived alcohol, a rosin, rosin ester and/or an oil.

Another embodiment of the invention is directed to an adhesive comprising an epoxidized block copolymer, a rosin derived alcohol, and a photoinitiator. The adhesives of the invention may optionally further comprise a hydrocarbon resin, a saturated block copolymer, a rosin, rosin ester and/or an oil.

In a preferred embodiment of the present invention the adhesive composition comprises from about 15% to about 35% by weight of at least one epoxidized block copolymer, from about 5% to about 15% by weight of at least one saturated block copolymer, from about 30% to about 60% by weight of at least one hydrocarbon resin, from about 3 to about 15% of a rosin derived mono-ol, from about 0.02 to about 2.0% of a cationic photoinitiator, from about 0 to about 25% of a rosin and/or rosin ester, from about 0 to about 30% of a mineral oil, and from about 0 to about 2% of an antioxidant.

The adhesive compositions of the invention are prepared by conventional methods. As an example, the epoxidized block copolymer and saturated block copolymer or tackifying resin and other desired components may be blended at an elevated temperature, (e.g. temperature of about 300° F.) using an extruder, a Z-blade mixer or other conventional mixing device.

The adhesives of the invention find particular use in the tape and label industry.

The adhesives of the present invention may be used to bond labels to plastic, glass or plastic-coated glass, wood, metal, etc. articles, such as containers and bottles (i.e., soft drink, salad dressing, sauce and condiment bottles, cans, buckets and beakers). Plastic as used herein refers to the material used to make food and other storage containers such as polyethylene, polypropylene, polystyrene, polycarbonate, polyvinylchloride, and polyethylene terephthalate (PET). The labels may be made of paper, coated paper, embossed paper, metallized paper, foil laminated paper, or various plastic films (eg. polyvinyl chloride, polystyrene, polyethylene terephthlate, polypropylene, polyethylene), and may be opaque or transparent. To attach the labels to the article, the adhesive is applied to the surface of the article or to the label. The adhesive may be applied by a variety of methods including coating or spraying in an amount sufficient to cause the substrates to be bonded together to adhere. The adhesive coated substrate (e.g., label or article) may be irradiated before or after bonding. Since cure begins immediately upon irradiation, but may not be completed for several days, there is time immediately after irradiation, but before gelation for bonding to take place. Ideally, the bond is made before irradiation for optimum wet out and adhesion. For labels produced off line from the bottle labeling process, and for tapes, the adhesive is applied to the release paper or the backing, then irradiated and bond to the other surface (release or backing), and finally is wound into a roll of adhesive tape or label stock.

The pressure sensitive adhesives of the invention also may advantageously be used in the manufacture of adhesive articles including, but not limited to, industrial tapes and transfer films. Single and double face tapes, as well as supported and unsupported free films are encompassed by the invention. In one embodiment, the adhesive article comprises an adhesive coated on at least one major surface of a backing having a first and second major surface. Useful backing substrates include, but are not limited to, foam, metal, paper, fabric, and various polymers such as polypropylene, polyamide, polyester, polyethylene terephthalate, and mixtures thereof. The adhesive may be present on one or both surfaces of the backing. When the adhesive is coated on both surfaces of the backing, they can be the same or different.

The invention can be illustrated by the following non-limiting examples.

EXAMPLES

In the Examples that follow, the following tests were used.
Viscosity
Brookfield Viscometer with Thermosel heating unit, spindle 27.
Coating/Bonding/Conditioning
All coatings were 2 mils on a 1.5 mil PET backing. All bonds were made automatically using a Chemsultants automated roller (4.5 lb). All conditioning and testing was done at 73 F./50% RH unless noted otherwise.
Loop Tack
Coatings were tested in a TMI loop tack tester against smooth stainless steel panels.
Peel
Coatings were bonded to stainless steel panels, given 20 minutes to complete wet out, and then peeled at 12 inches/min.
Shear
Coatings were bonded with a 1 inch×1 inch overlap to stainless steel panels and then conditioned for 20 minutes. For room temperature shears (73° F.) a weight of 2 kg was hung and time to failure was recorded. For elevated temperature shears, the bonded and conditioned samples were transferred to an oven at 200° F. and allowed to thermally equilibrate for 15 minutes, and then a 500 gram weight was hung from the sample.
SAFT (Shear Adhesion Failure Temperature)
Shear samples were prepared as described above. These samples were allowed to equilibrate in an oven for 15 minutes, in most cases starting at 180° F.–200° F., and then a 500 gram weight was hung. Subsequently the temperature of the oven was increased 10° F. every 15 minutes until failure was noted or 300° F. was reached.
Free Swell
Adhesive tapes prepared as described above were weighed and then immersed in cyclohexane. The adhesive coating released from the backing upon swelling and was weighed, as was the dried backing material. The weight of the swollen adhesive film was weighed periodically until its weight had equilibrated. The equilibrium weight of the swollen gelled adhesive network was compared to the initial weight prior to immersion in cyclohexane. Uncured adhesives are completely soluble in cyclohexane.

Example 1

Various block copolymers that may be used in preparing adhesive formulations of the invention are described in Table 1.

TABLE 1

|  | % Styrene | % Diblock | Linear or Radial | MFI |
|---|---|---|---|---|
| EKP 207 | 0 | 0 | L | High |
| SEBPS Septon 4077 | 30 | 0 | L | <1 |
| (SEP)$_x$ Kraton G 1780 | 8 | 0 | R | — |
| (EP)$_x$ Kraton G 1750 | 0 | 0 | R | 7.5 |
| SEPEP Kraton G 1730 | 22 | 0 | L | 13 |
| (SEB)$_2$-X-I$_2$ Kraton GRP6919 | 18 | 0 | R | — |
| SEBS Kraton G 1657 | 13 | 29 | L | 8 |
| SEPS Septon 2043 | 13 | 43 | L | 3 |
| PIB Vistanex LM-H-LC | 0 | — | — | — |

Adhesive samples were prepared by melting and mixing until homogeneous components listed in Table 2 (% by weight). Mix temperatures were held at about 300° F. Where styrenic block copolymers were used, the block copolymer was masticated at high shear with oil and antioxidant and then the tackifiers were slowly added. The remaining oil and epoxidized block copolymer was added at the end of the reaction. Photoinitiator was added during the mastication step if added neat. If already dispersed in epoxidized block copolymer, it was added in the final charge to minimize coalescence of the photoinitiator particles.

Samples A–F were all compatible in the melt, with no tendency for separation upon standing in the molten state. In addition, the adhesives were all solid materials, which did not cold flow upon standing to take the shape of their container. These examples demonstrate that saturated styrenic block copolymers can be used to create solid, melt-applied adhesives using an epoxidized block copolymer as the base. The best PSA property balance was obtained with Kraton GRP 6919 (sample C). Good peel and tack and excellent shear at elevated temperature were recorded.

The other advantage of adding these saturated block copolymers is that the adhesives have better hot tack and green strength prior to cure. Such properties are especially useful in high speed melt applied applications such as in-line labeling.

TABLE 2

|  | Sample A | Sample B | Sample C | Sample D | Sample E | Sample F |
|---|---|---|---|---|---|---|
| EKP 207 | 21 | 21 | 21 | 21 | 21 | 21 |
| (SEP)$_x$ Kraton G 1780 | 8 | — | — | — | 10 | — |
| (EP)$_x$ Kraton G 1750 | — | — | — | — | 5 | — |
| (SEB)$_2$-X-I$_2$ Kraton G RP6919 | — | — | 8 | — | — | 10 |
| SEBS Kraton G 1657 | — | 8 | — | — | — | — |
| SEPS Septon 2043 | — | — | — | 10 | — | — |
| PIB Vistanex LM-H-LC | — | — | — | — | — | 15 |
| Escorez 5400 | 55 | 52 | 52 | 50 | 45 | 35 |
| Britol 35T | 12 | 15 | 15 | 15 | 15 | 15 |
| Irganox 1010 | 0.5 | 0.5 | 0.5 | 0.5 | 0.5 | 0.5 |
| 5% UVI 6974 in EKP 207 | 4 | 4 | 4 | 4 | 4 | 4 |
| Viscosity (cP) @ 275° F. | 5250 | 1790 | 1208 | 1785 | 19950 | 21500 |
| @ 325° F. | 1905 | 435 | 463 | 685 | 7800 | 4140 |

EKP 207 is an epoxidized isoprene/ethylene butylene diblock copolymer available from Kraton Polymers and described above in more detail.
(SEP)$_x$ Kraton G 1780 is a styrene/ethylene propylene >4 armed radial block copolymer available from Kraton Polymers.
(EP)$_x$ Kraton G 1750 is an ethylene propylene >4 armed radial polymer available from Kraton Polymers.
(SEB)$_2$-X-I$_2$ Kraton G RP6919 is a four armed block copolymer available from Kraton Polymers described above.
SEBS Kraton G 1657 is a high diblock linear styrene/ethylene butylene block copolymer available from Kraton Polymers.
SEPS Septon 2043 is a high diblock linear styrene/ethylene propylene block copolymer available from Kurary.
PIB Vistanex LM-H-LC is a low molecular weight polyisobutylene available from Exxon-Mobil.
Escorez 5400 is a highly hydrogenated dicyclopentadiene-based hydrocarbon tackifier available from ExxonMobil.
Britol 35T is a paraffinic white oil available from Witco.
Irganox 1010 is a hindered phenol antioxidant available from Ciba-Geigy.
5% UVI 6974 in EKP207 is a dispersion of a triarylsufonium hexafluroantimonate (UVI 6974 available from Union Carbide) in EKP 207 obtained from Kraton Polymers.

Adhesive properties of the cured adhesives on stainless steel are shown in Table 3. These samples were prepared by coating directly onto the 1.5 mil mylar backing using heated rollers, placing the coating on a glass plate at 70° C., thermally equilibrating for 10 minutes, then passing the warm sample under a 300 watt/in Fusion H bulb at 20 ft/min. Samples were allowed to completely cure for at least 3 days before testing.

Example 2

This example compares a prior art adhesive (Sample G) with an embodiment of the invention (Sample H). The formulations of these adhesives are described in Table 4.

TABLE 3

|  | Sample A | Sample B | Sample C | Sample D | Sample E | Sample F |
|---|---|---|---|---|---|---|
| Loop Tack (oz/in$^2$) | 23 ± 18 | — | 51 ± 15 | 62 ± 5 | 44 ± 3 | 28 +/− 8 |
| Peel (lb/in @ 12 in/min | 4.7 ± 0.1 | — | 3.7 ± 0.07 | 3.5 ± 0.1 | 2.4 ± 0.1 | 2.4 ± 0.2 |
| Shear (hrs) at RT, 2 kg | >290 | — | — | — | — | — |
| (hrs) at 200° F., 500 g | 1 | — | >24 | 0.1 | >24 | >24 |

TABLE 4

|  | Sample G | Sample H |
|---|---|---|
| EKP-207 | 18.52 | 24.8 |
| L-1203 | 34.4 | 0 |
| Kraton GRP 6919 | 0 | 10 |
| Regalite T1140 | 46.99 | 0 |
| KR-610 | 0 | 10 |
| Escorez 5400 | 0 | 42 |
| Abitol E | 0 | 5 |
| Britol 35T | 0 | 8 |
| Irganox 1010 | 0.5 | 0.5 |
| UVI-6974 | 0.08 | 0.2 |
| Viscosity(cP) |  |  |
| 150° F. | 20700 | — |
| 185° F. | 4700 | — |
| 225° F. | 1330 | — |
| 275° F. | — | 1865 |
| 325° F. | — | 695 |

L-1203 is an ethylene butylene end-functional mono-ol with a molecular weight of 4200 g/mol available from Kraton polymers.
Regalite T1140 is a hydrogenated hydrocarbon with a softening point of 140 C. available from Hercules.
KR-610 is a hydrogenated rosin available from Arakawa Chemical Co.

These samples were run at either 30 fpm and 25% UV bulb power or 40 fpm and 33% power on an IMC coater using a 450 Watt/in Aetek H bulb (thus each adhesive received roughly an equivalent dose of UV light). Adhesive was coated to release paper (Akrosil B2H 2.5 SC) and transferred to 1.5 mil PET backing (Flexel Inc. item #05907).

Adhesive properties of the cured adhesives on stainless steel are shown in Table 5.

TABLE 5

|  | Speed | Thickness (mils) | Loop Tack oz/in2 | Peel (lb/in) 20 min. | SAFT (° F.) | *Shear (hrs) 200° F., 1 psi | Adhesive Observations |
|---|---|---|---|---|---|---|---|
| Sample G | 40 | 5 | 109 ± 18 | 7.41 ± 0.29 | >300 (3/4) | all >20 | No failure |
|  | 40 | 9–10 | 108 ± 13 | 6.96 ± 0.13 |  | 0.1, 1, 4 | Adhesive failure |
| Sample H | 30 | 4–5 | 134 ± 8 | 7.70 ± 0.21 | >300 (4/4) | all >20 | No failure |
|  | 30 | 9–10.5 | 157 ± 10 | 7.34 ± 0.23 |  | all >20 | No failure |

*Triplicate test numbers reported

Sample G is an example of a prior art adhesive designed for high peel. Sample H is an example of an adhesive in accordance with the invention in a form suitable for PSA applications. Sample H is a solid adhesive that is easier to handle. It is less expensive because it avoids the use of the expensive specialty mono-ol (L1203) recommended in the prior art references from Kraton Polymers (M. Dupont and M. Masse, Adhesives Age, March 2001, p. 18). The invention instead uses inexpensive mineral oil and a more effective mono-ol for developing PSA properties, rosin alcohol. The formula is less expensive, exhibits better elevated temperature adhesion, better tack, and slightly higher peel.

Example 3

The free swell in cyclohexane of Samples C and H were compared. Sample C exhibited a 77% increase in weight whereas the Sample H was 180% heavier. The higher swell of sample H indicates a looser crosslinked network, despite the higher polymer content. This looser network is probably due to chain transfer reactions to the rosin alcohol present in Sample H during radiation cure. A looser crosslinked network is desirable for improved pressure sensitive properties, as are obtained with Sample H versus Sample C.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A radiation curable adhesive comprising an epoxidized block copolymer, a rosin derived alcohol, and a photoinitiator.

2. The adhesive of claim 1 wherein the adhesive further comprises a hydrocarbon resin, a rosin and/or rosin ester, and an oil.

3. The adhesive of claim 1 wherein the photoinitiator is triaryl sulfonium hexafluoroantimonate.

4. The adhesive of claim 1 which is a pressure sensitive hot melt adhesive.

5. A radiation curable adhesive comprising from about 15% to about 35% by weight of an epoxidized block copolymer, from about 5% to about 15% by weight of at least one saturated block copolymer, from about 30% to about 60% by weight of at least one hydrocarbon resin, from about 3 to about 15% of a rosin derived mono-ol, up to about 25% of a rosin and/or rosin ester, up to about 30% of a mineral oil, and up to about 2% of an antioxidant.

6. An article of manufacture comprising the adhesive of claim 1.

7. The article of claim 6 which is a labeled container.

8. The article of claim 6 which is an adhesive tape.

9. The adhesive of claim 1 comprising an epoxidized block copolymer, a saturated block copolymer, a rosin derived alcohol and a photoinitiator.

10. The adhesive of claim 9, wherein the saturated block copolymer is a saturated styrenic block copolymer.

11. The adhesive of claim 9 wherein the adhesive further comprises a hydrocarbon resin, a rosin and/or rosin ester, and an oil.

12. The adhesive of claim 9 wherein the photoinitiator is triaryl sulfonium hexafluoroantimonate.

13. An article of manufacture comprising the adhesive of claim 9.

14. The article of claim 13 which is a labeled container.

15. The article of claim 13 which is an adhesive tape.

* * * * *